United States Patent
Li et al.

(10) Patent No.: US 9,533,514 B2
(45) Date of Patent: Jan. 3, 2017

(54) NEAR-INFRARED LASER FOCUSING LENS AND LASER PRINTING DEVICE

(71) Applicants: HAN'S LASER TECHNOLOGY INDUSTRY GROUP CO., LTD., Shenzhen (CN); HAN'S CNC SCIENCE AND TECHNOLOGY CO., LTD., Shenzhen (CN)

(72) Inventors: Jiaying Li, Shenzhen (CN); Chaoming Zhou, Shenzhen (CN); Bo Sun, Shenzhen (CN); Yunfeng Gao, Shenzhen (CN)

(73) Assignees: HAN'S LASER TECHNOLOGY INDUSTRY GROUP CO., LTD, Shenzhen (CN); HAN'S CNC SCIENCE AND TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/439,360

(22) PCT Filed: Oct. 31, 2012

(86) PCT No.: PCT/CN2012/083858
§ 371 (c)(1),
(2) Date: Apr. 29, 2015

(87) PCT Pub. No.: WO2014/067103
PCT Pub. Date: May 8, 2014

(65) Prior Publication Data
US 2015/0298465 A1    Oct. 22, 2015

(51) Int. Cl.
*B41J 15/14* (2006.01)
*B41J 27/00* (2006.01)
(Continued)

(52) U.S. Cl.
CPC .................. *B41J 2/455* (2013.01); *B41J 2/435* (2013.01); *G02B 9/60* (2013.01); *G02B 13/14* (2013.01);
(Continued)

(58) Field of Classification Search
USPC ........ 347/244, 258; 359/676, 684, 686, 687, 359/738
See application file for complete search history.

(56) References Cited

U.S. PATENT DOCUMENTS

| 4,403,837 A | 9/1983 | Nakahashi |
| 5,920,379 A | 7/1999 | Matsuyama |

(Continued)

FOREIGN PATENT DOCUMENTS

| CN | 101093275 A | 12/2007 |
| CN | 101827707 A | 9/2010 |

(Continued)

OTHER PUBLICATIONS

International Search Report dated Aug. 8, 2013.
(Continued)

*Primary Examiner* — Hai C Pham
(74) *Attorney, Agent, or Firm* — Polsinelli PC

(57) ABSTRACT

A near-infrared laser focusing lens and a laser printing device are provided. The lens comprises a first lens, a second lens, a third lens, a fourth lens and a fifth lens (L1, L2, L3, L4, L5) which are coaxially arranged along a transmission direction of incident light rays, wherein the first lens (L1) is a negative plane-concave lens; the second lens and the third lens (L2, L3) are positive biconvex lenses; and the fourth lens and the fifth lens (L4, L5) are positive meniscus lenses; and a concave surface (S2) of the first lens (L1) is opposite to the second lens (L2), and the middle parts of the fourth lens and the fifth lens (L4, L5) both reversely protrude
(Continued)

towards the transmission direction of light beams. After the shapes and the relative locations of the lenses are designed, the near infrared light can be clearly imaged, and the geometrical aberration of the lens can be effectively corrected, so as to obtain a clear flat field. In addition, because of having a large relative aperture and visual field and a long working distance, the lens is a microscope objective simultaneously having a large visual field, a large relative aperture, a long working distance and a flat field, and is capable of improving printing precision and clarity, so that the color rendition is truer and the operation is more convenient.

16 Claims, 3 Drawing Sheets

(51) Int. Cl.
*B41J 2/455* (2006.01)
*G02B 9/60* (2006.01)
*G02B 13/14* (2006.01)
*G02B 13/24* (2006.01)
*G02B 13/18* (2006.01)
*B41J 2/435* (2006.01)
*H01S 3/02* (2006.01)

(52) U.S. Cl.
CPC ............... *G02B 13/18* (2013.01); *G02B 13/24* (2013.01); *H01S 3/02* (2013.01)

(56) References Cited

U.S. PATENT DOCUMENTS

| | | | |
|---|---|---|---|
| 6,072,518 | A | 6/2000 | Gelbart |
| RE37,376 | E | 9/2001 | Gelbart |
| 7,136,229 | B2 | 11/2006 | Wartmann et al. |
| 8,526,128 | B2* | 9/2013 | Kubota ................... G02B 9/64 359/762 |
| 2005/0117214 | A1 | 6/2005 | Wartmann et al. |
| 2005/0213171 | A1* | 9/2005 | Miyagawa ............ B41C 1/1041 358/481 |
| 2009/0101034 | A1 | 4/2009 | Aviel |
| 2011/0216398 | A1 | 9/2011 | Ando |

FOREIGN PATENT DOCUMENTS

| | | |
|---|---|---|
| CN | 102193170 A | 9/2011 |
| EP | 1519210 A1 | 3/2005 |
| RU | 2434256 C1 | 11/2011 |

OTHER PUBLICATIONS

International Search Report with English translation dated Aug. 8, 2013 from International Application No. PCT/CN2012/083858, pp. 1-16.
European Search Report dated Jun. 6, 2016 from European Application No. 12887440.1, pp. 1-10.
Smith, Warren J. "Modern Lens Design" in Modern Lens Design, Jan. 1, 1992, McGraw Hill, Inc., pp. 25-27.
Office Action dated Jul. 4, 2016 from Chinese Application No. 201280076750.6, pp. 1-4.

* cited by examiner

NEAR-INFRARED LASER FOCUSING LENS AND LASER PRINTING DEVICE

CROSS-REFERENCE TO RELATED APPLICATIONS

This application is a National Phase filing under 35 U.S.C. §371 of PCT/CN2012/083858 filed on Oct. 31, 2012, the entire contents of which is hereby incorporated by reference.

FIELD OF THE INVENTION

The present disclosure relates to a field of optical technology, and more particularly relates to a near-infrared laser focusing lens and a laser printing device.

BACKGROUND OF THE INVENTION

As the development of the laser processing technology, the laser printing technology is extensively applied to the fields of electronic composition, laser plate making and so on, greatly simplifying the printing technology. The digitization of the laser printing technology can realize a remote plate making and printing, thereby speeding up the press and publication, and also economizing the cost and human input on a large scale. The laser applied to the field of printing enables a rapid development of the printing industry.

The realizing of the laser printing technology not only depends upon a widespread use of the fiber laser, but also profits from the continuously upgrading of parameters of the optical focusing system. The laser printing device generally has a focusing lens, and the focusing lens is desired to have a large relative aperture and a large visual field angle, and is expected to have a longer working distance. Existing focusing lens applied to laser printing generally adopts microscope, and focuses the ultraviolent laser. Though the microscope has a large relative aperture, but the visual field angle is small, the working distance is short, and the operation is inconvenient, thus affecting the focusing effect, and further affecting the printing quality. The printing precision and clarity are not ideal and the color rendition is not true. Therefore, it is desired to provide a new focusing lens applied to laser printing.

SUMMARY OF THE INVENTION

Technology Problem

It is an object of the present invention to provide a near-infrared laser focusing lens, for addressing the problem of a low printing quality of ultraviolent lens affected by a focusing effect due to a small relative aperture, and a short working distance.

Technology Solution

The invention is accomplished as follows: a near-infrared laser focusing lens includes a first lens, a second lens, a third lens, a fourth lens, and a fifth lens, which are coaxially arranged successively along a transmission direction of an incident light beam;

wherein the first lens is a negative plane-concave lens, the second and the third lens are positive biconvex lenses, and the fourth lens and the fifth lens are positive meniscus lenses, a concave surface of the first lens faces the second lens, middle portions of the fourth lens and the fifth lens protrude reverse to the transmission direction of the incident light beam Further, it is an object of the present invention to provide a laser printing device, including a fiber laser, a printing drum, and a focusing lens configured to focus a laser emitted from the fiber laser on the printing drum, wherein the focusing lens is the described near-infrared laser focusing lens.

Advantages

By designing the shape and relative positions of various lens, the invention can form a clear image for the near-infrared light, and effectively correct the geometrical aberration of the lens, thus obtaining a clear flat field. In addition, the lens has a relative large aperture, a large visual field, and a long working distance. The lens is a microscope objective having a large visual filed, a large relative aperture, a long working distance, and a flat field, and further enabling the printing device having the lens to have a high printing precision and clarity. The color rendition of the lens is more real, and simultaneously, the lens facilitates to operation due to the long working distance.

DETAILED DESCRIPTION OF THE EMBODIMENTS

These and other features of the present invention will become readily apparent upon further review of the following specification and drawings. The various embodiments of the invention may, however, be embodied in many different forms and should not be construed as limited to the embodiments set forth herein.

The following detailed description refers to the accompanying drawings that show, by way of illustration, specific details and embodiments in which the invention may be practiced.

Figure 1:
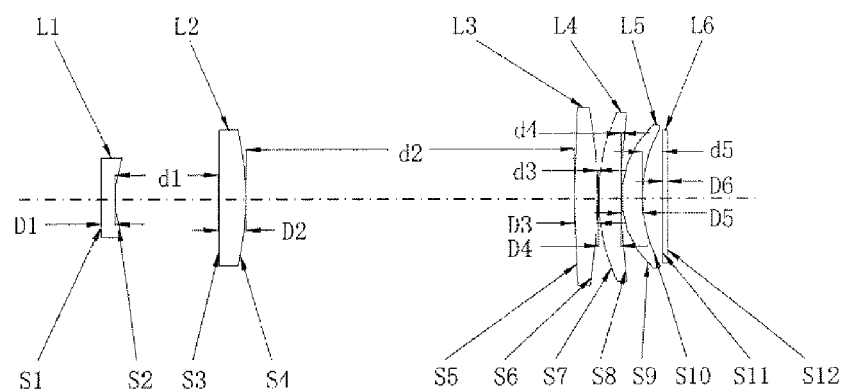
FIG. 1 is a schematic view of a near-infrared laser focusing lens according to an embodiment of the present invention.

FIG. 1 is a schematic view of a near-infrared laser focusing lens according to an embodiment of the present invention. In order to facilitate illustration, FIG. 1 merely shows a portion of the near-infrared laser focusing lens associated with the embodiment.

The near-infrared laser focusing lens includes a first lens L1, a second lens L2, a third lens L3, a fourth lens L4 and a fifth lens L5 which are coaxially arranged along a transmission direction of the incident light beam. The first lens L1 is a negative plane-concave lens, the incident surface is a planar surface, and the emergent surface is a concave surface. The concave surface faces the second lens L2. Both the second lens L2 and the third lens L3 are positive biconvex lenses, the incident surface and the emergent surface thereof protrude outwardly from opposite sides. The fourth lens L4 and the fifth lens L5 are positive meniscus lenses, the radiuses of curvature of the incident surfaces of the two lenses are less than the radiuses of curvature of the emergent surfaces, i.e. the middle portions of the fourth lens L4 and the fifth lens L5 reversely protrude toward the transmission direction of the incident light beam, that is, protruding toward the object side.

Further, parameters such as the surface curvatures and the thicknesses of the lenses are optimized in the embodiment. Specifically, the first lens L1 includes a first surface S1 and a second surface S2, the radiuses of curvature of the first surface S1 and the second surface S2 are ∞ and 25.5 mm, respectively; the second lens L2 includes a third surface S3 and a fourth surface S4, the radiuses of curvature of the third surface S3 and the fourth surface S4 are 500 mm and −60 mm, respectively; the third first lens L3 includes a fifth surface S5 and a sixth surface S6, the radiuses of curvature of the fifth surface S5 and the sixth surface S6 are 200 mm and −100 mm, respectively; the fourth lens L4 includes a seventh surface S7 and a eighth surface S8, the radiuses of curvature of the seventh surface S7 and the eighth surface S8 are 40 mm and 130 mm, respectively; the fifth lens L5 includes a ninth surface S9 and a tenth surface S10, the radiuses of curvature of the ninth surface S9 and the tenth surface S10 are 20 mm and 30 mm, respectively. The minus indicates that a spherical center of the curved surface is located at the object side of the curved surface, numeral value without plus or minus represents a plus, the plus indicates that a spherical center of the curved surface is located at the image side of the curved surface, Above described first surface to tenth surface are arranged successively along the transmission direction of the laser, and each above described radius of curvature is not the only choice and has a tolerance range of 5%.

Furthermore, the center thicknesses D of the first lens to the fifth lens, and the distance d between the surfaces are particularly designed in the embodiment. Specifically, the center thicknesses D1, D2, D3, D4, and D5 of the first to the fifth lenses are 3 mm, 6 mm, 5 mm, 5 mm, and 4 mm respectively, and each has a tolerance range of 5%. Further, a distance d1 on the optical axis between the second surface S2 of the first lens L1 and the third surface S3 of the second lens L2 is 20 mm; a distance d2 on the optical axis between the fourth surface S4 of the second lens L2 and the fifth surface S5 of the third lens L3 is 70 mm; a distance on the optical axis between the sixth surface S6 and the seventh surface S7 is 0.2 mm; a distance on the optical axis between the eighth surface S8 of the ninth surface S9 is 0.2 mm. Above surface distances have a tolerance of 5%.

In addition, above lenses are preferably made of the following materials. A ratio of refractive index to Abbe number of the material of the first lens L1 Nd/Vd is 1.5/64. The second, third, fourth, and fifth lenses can be made of the same material, the ratios of refractive index to Abbe number NdNd are 1.8/25, each refractive index and Abbe number has a tolerance of 5%.

Further, in the embodiment, a sixth lens L6 is additionally positioned on the light emergent side of the fifth lens L5. Preferably, the sixth lens L6 is a flat lens, and includes an eleventh surface S11 and a twelfth surface S12, the radiuses of curvature of the eleventh surface S11 and the twelfth surface S12 are ∞; the sixth lens L6 is mainly applied to protect the other imaging lenses, avoiding the other imaging lenses from being affected by dust, moisture, high temperature and low temperature and so on.

In detail, the sixth lens L6 may be made of material same as the first lens L1, the ratio of refractive index to Abbe number Nd/Vd is 1.5/64, the tolerance is 5%. The center thickness D6 of the sixth lens L6 can be 1 mm, the tolerance is 5%. In addition, a distance d5 on the optical axis between the eleventh surface S11 of the sixth lens L6 and the tenth surface S10 of the fifth lens L5 is 4.4 mm, the tolerance is 5%.

According to above content, a near-infrared laser focusing lens is provided as follows, please refer to table 1 for details.

TABLE 1 structural parameters of the near-infrared laser focusing lens

| L (lens) | S (surface) | R (radius of curvature) | d (distance between surfaces) | D (center thickness) | Nd/Vd (material) |
|---|---|---|---|---|---|
| 1 | 1 | ∞ | | 3 | 1.5/64 |
| | 2 | 25.5 | 20 | | |
| 2 | 3 | 500 | | 6 | 1.8/25 |
| | 4 | −60 | 70 | | |
| 3 | 5 | 200 | | 5 | 1.8/25 |
| | 6 | −100 | 0.2 | | |
| 4 | 7 | 40 | | 5 | 1.8/25 |
| | 8 | 130 | 0.2 | | |
| 5 | 9 | 20 | | 4 | 1.8/25 |
| | 10 | 30 | 4.4 | | |
| 6 | 11 | ∞ | | 1 | 1.5/64 |
| | 12 | ∞ | | | |

The near-infrared laser focusing lens has optical characteristics as follows:

The optical wavelength $\lambda$=830 nm;

The focal length f=19 mm;

The relative aperture D'/f=1:0.85;

The visual field 2$\eta$=4 mm, the visual field angle 2$\omega$=12°;

The working distance (the protection glass is deducted) L'=0.95 f, the actual working distance L0'=1.2 f;

The magnification $\Gamma$=6×

Based upon above parameters, in geometrical optics, the lens can be regarded as a microscope object having a large relative aperture, a long working distance, a large visual filed, and a flat field.

After the lens is designed with above shape, relative locations, and parameters, it can form a clear image for the near-infrared light (wavelength $\lambda$=830 nm, for example), and effectively correct the geometrical aberration of the lens, obtaining a clear flat field and having a large relative aperture, a large visual field, and a long working distance. Specifically, the relative aperture D'/f (a ratio of the clear aperture to the focal length) of the lens can reach 1:0.85; the visual field 2$\eta$ is about 4 mm, the visual field angle 2$\omega$ is about 12°, the working distance L' is at least 0.95 f. Thus, the lens is a microscope object having a large visual filed, a large relative aperture, a long working distance, and a flat field, enabling to effectively improve the printing precision and clarity. The color rendition of the lens is true, and simultaneously, the lens facilitates to operation due to the long working distance.

FIGS. 2 through 5 represent the imaging quality of the Fθ lens used for infrared laser cutting from different perspectives, respectively.

Figure 2:
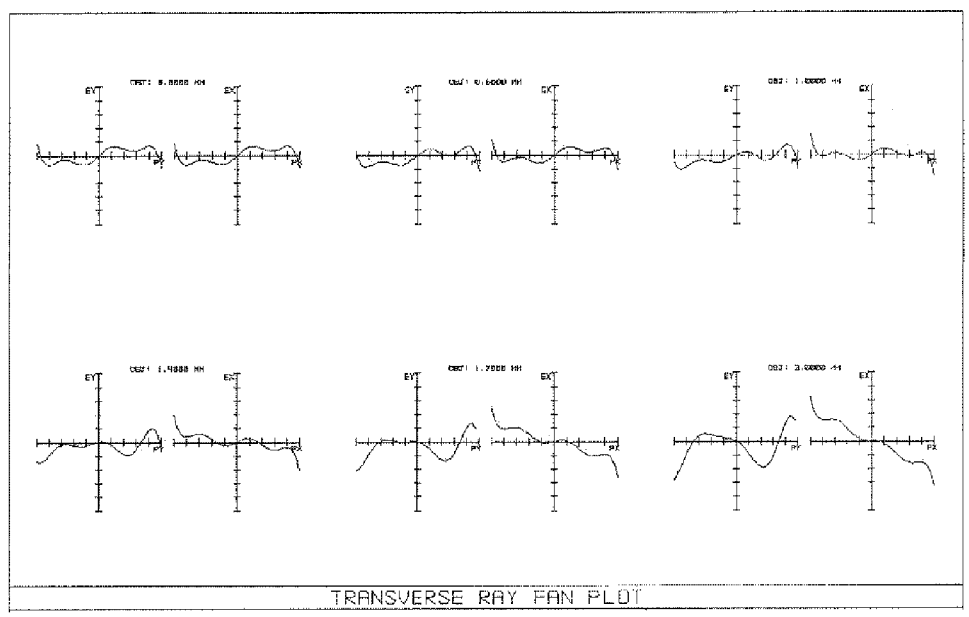
FIG. 2 are graphs illustrating a geometrical aberration of the near-infrared laser focusing lens according to an embodiment of the present invention.

FIG. 2 indicates geometrical aberration curve, and presents aberrations in 6 different visual fields. In each aberration graph of different visual fields, the views on the left and the right respective represents aberrations of the meridian and sagittal directions. The curve graph indicates that the lens is effectively corrected, and imaging clearly.

Figure 3:
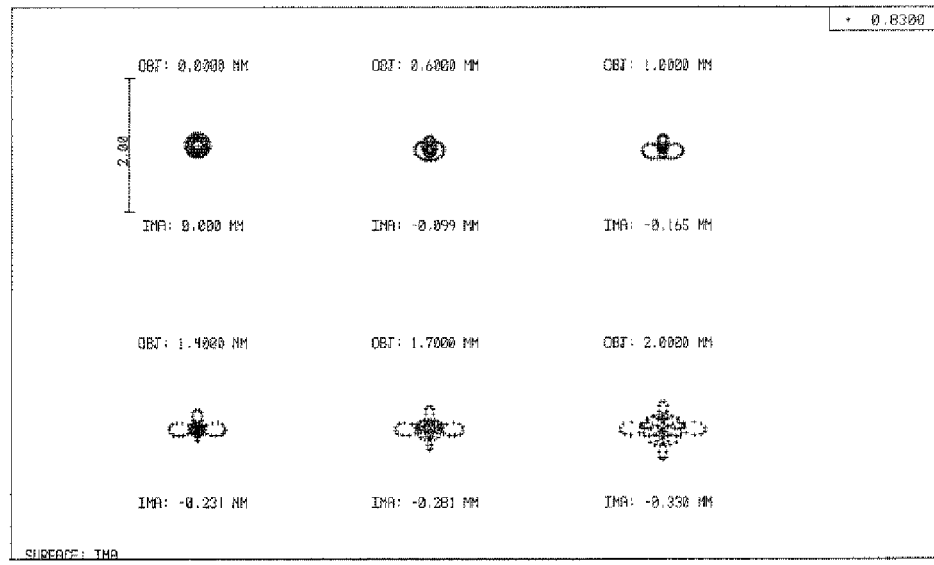
FIG. 3 are spot diagrams of the near-infrared laser focusing lens according to an embodiment of the present invention.

FIG. 3 represents spot diagrams in different visual fields, the reference range of FIG. 3 is 2 μm. The figure shows that the defocused spot has a smaller size and a concentration of energy is high, benefiting the printing precision.

Figure 4:
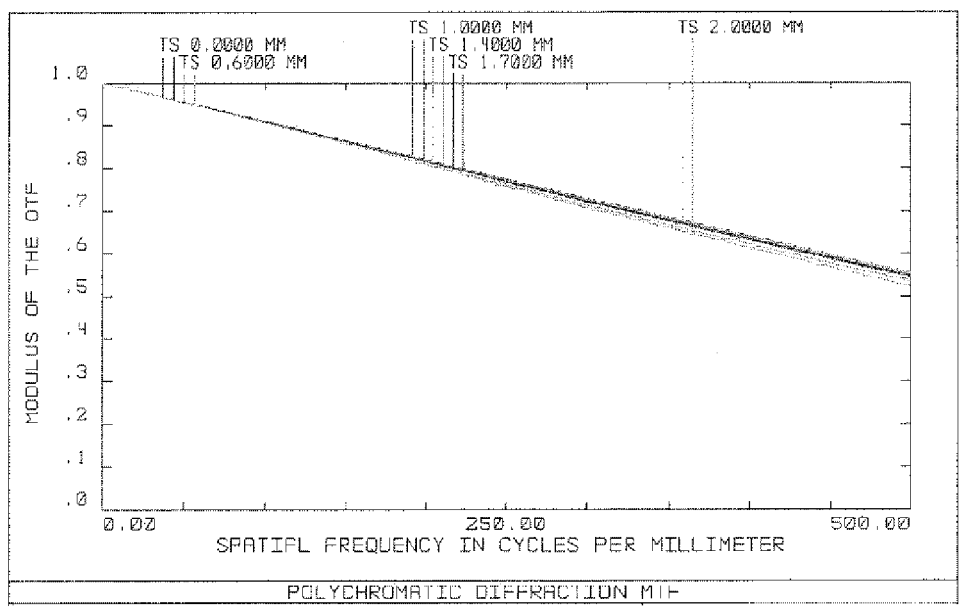
FIG. 4 is a graph illustrating a transfer function M.T.F characteristic of the near-infrared laser focusing lens according to an embodiment of the present invention.

FIG. 4 represents transfer function M.T.F, the horizontal axis indicates the number of line pair per millimeter Xlp/mm, the vertical axis indicates percentage. As a laser dense printing lens, it is desired to have a high resolution. As can be seen from the figure, when the resolution is 500 lp/mm, the transfer function M.T.F is still more than 60%, completely meeting the printing requirement.

Figure 5:
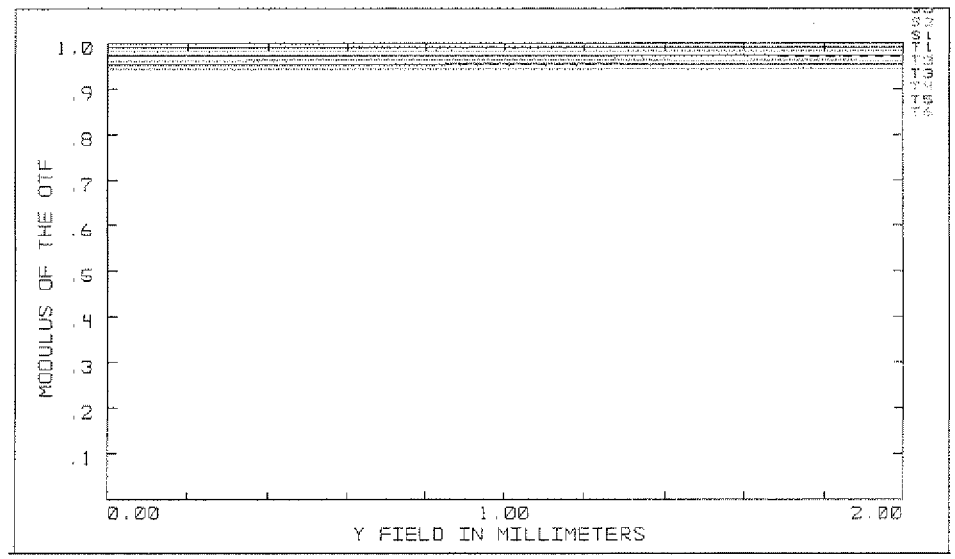
FIG. 5 is a graph illustrating an optical transfer function O.T.F characteristic of the near-infrared laser focusing lens according to an embodiment of the present invention.

FIG. 5 represents optical transfer function O.T.F, the horizontal axis indicates the visual field, the visual field of the figure is 2 mm, the vertical axis indicates percentage of the transfer function, the higher, the better. FIG. 5 indicates that when the visual field is 2 mm and the line pair number is 200 lp/mm, the transfer function has already reached 100%, which can fully meet the printing requirement.

According to above described figures, the image quality of the focusing lens with a large visual field, a large relative aperture, and an extra-long working distance reaches a value limit in optimal level, completely forming a flat field. Adopting the lens as a microscope objective of a printing device, in the imaging range of Φ4 mm, the wave aberrations is less than 0.1λ (0.1 times of the incident light wavelength), and the printing precision is relative high.

Figure 6:
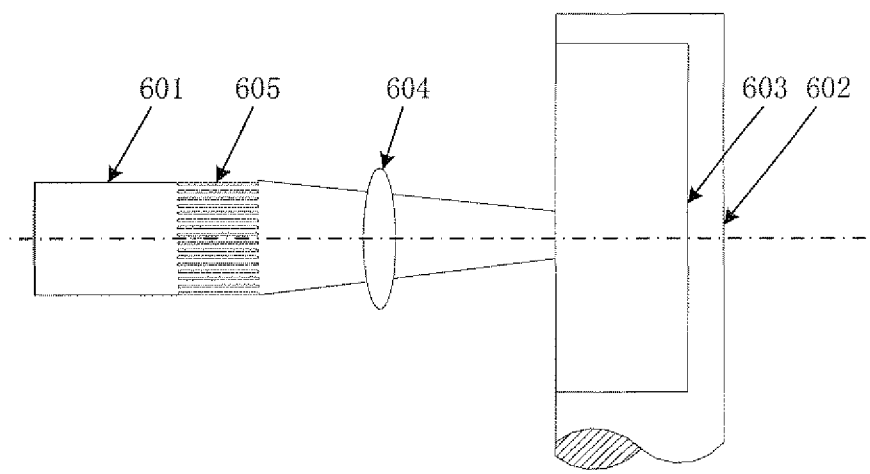
FIG. 6 is a schematic view of a laser printing device according to an embodiment of the present invention.

The invention further provides a laser printing device, referring to FIG. 6, the laser printing device includes a fiber laser 601 and a printing drum 602 capable of rotating at a high speed. The printing drum 602 is provided with a printing dielectric layer 603, and a focusing lens 604 is positioned between the fiber laser 601 and the printing drum 602. The focusing lens 604 is configured to focus the laser emitted from the fiber laser 601 on the printing dielectric layer 603 which is located on the printing drum 602. The focusing lens 604 adopts the near-infrared laser focusing lens provided by the invention to realize a laser printing with a high definition, a high precision, and a true color.

Further, the fiber laser 601 has an output end connected to a plurality of densely arranged fibers, which are configured to transfer the laser to the near-infrared laser focusing lens 604. In the embodiment, 64 fibers are adopted to perform a laser transmission.

Although the present invention has been described with reference to the embodiments thereof and the best modes for carrying out the present invention, it is apparent to those skilled in the art that a variety of modifications and changes may be made without departing from the scope of the present invention, which is intended to be defined by the appended claims.

What is claimed is:

1. A near-infrared laser focusing lens, comprising a first lens, a second lens, a third lens, a fourth lens, and a fifth lens, which are coaxially arranged successively along a transmission direction of an incident light beam;
   wherein the first lens is a negative plane-concave lens, the second and the third lens are positive biconvex lenses, and the fourth lens and the fifth lens are positive meniscus lenses; a concave surface of the first lens faces the second lens, middle portions of the fourth lens and the fifth lens protrude reverse to the transmission direction of the incident light beam.

2. The near-infrared laser focusing lens according to claim 1, wherein the first lens comprises a first surface and a second surface, the second lens comprises a third surface and a fourth surface, the third first lens comprises a fifth surface and a sixth surface, the fourth lens comprises a seventh surface and a eighth surface, and the fifth lens comprise a ninth surface and a tenth surface, the first surface to tenth surface are arranged successively along the transmission direction of the incident light beam;
   radiuses of curvature of the first surface to tenth surface are ∞, 25.5 mm, 500 mm, −60 mm, 200 mm, −100 mm, 40 mm, 130 mm, 20 mm, and 30 mm, respectively, and each has a tolerance of 5%.

3. The near-infrared laser focusing lens according to claim 2, wherein center thicknesses of the first lens to the fifth lens are 3 mm, 6 mm, 5 mm, 5 mm, and 4 mm, respectively, and each has a tolerance of 5%.

4. The near-infrared laser focusing lens according to claim 3, wherein,
   a distance on an optical axis between the second surface and the third surface is 20 mm;
   a distance on the optical axis between the fourth surface and the fifth surface is 70 mm;
   a distance on the optical axis between the six surface and the seven surface is 0.2 mm;
   a distance on the optical axis between the eighth surface and the ninth surface is 0.2 mm;
   each of the distances has a tolerance of 5%.

5. The near-infrared laser focusing lens according to claim 4, wherein a ratio of refractive index to Abbe number of the first lens is 1.5/64;
   ratios of refractive index to Abbe number of the second, third, fourth, and fifth lenses are 1.8/25, each refractive index and Abbe number has a tolerance of 5%.

6. The near-infrared laser focusing lens according to claim 4, further comprising a sixth lens positioned on a light emergent side of the fifth lens, wherein the sixth lens comprises an eleventh surface and a twelfth surface, radiuses of curvature of the eleventh surface and the twelfth surface are ∞; a distance on the optical axis between the eleventh surface and the tenth surface is 4.4 mm with a tolerance of 5%.

7. The near-infrared laser focusing lens according to claim 3, wherein a ratio of refractive index to Abbe number of the first lens is 1.5/64;
   ratios of refractive index to Abbe number of the second, third, fourth, and fifth lenses are 1.8/25, each refractive index and Abbe number has a tolerance of 5%.

8. The near-infrared laser focusing lens according to claim 3, further comprising a sixth lens positioned on a light emergent side of the fifth lens, wherein the sixth lens comprises an eleventh surface and a twelfth surface, radiuses of curvature of the eleventh surface and the twelfth surface are ∞; a distance on the optical axis between the eleventh surface and the tenth surface is 4.4 mm with a tolerance of 5%.

9. The near-infrared laser focusing lens according to claim 2, wherein a ratio of refractive index to Abbe number of the first lens is 1.5/64;
   ratios of refractive index to Abbe number of the second, third, fourth, and fifth lenses are 1.8/25, each refractive index and Abbe number has a tolerance of 5%.

10. The near-infrared laser focusing lens according to claim 1, wherein a ratio of refractive index to Abbe number of the first lens is 1.5/64; ratios of refractive index to Abbe number of the second, third, fourth, and fifth lenses are 1.8/25, each refractive index and Abbe number has a tolerance of 5%.

11. The near-infrared laser focusing lens according to claim 1, further comprising a sixth lens positioned on a light emergent side of the fifth lens, wherein the sixth lens comprises an eleventh surface and a twelfth surface, radiuses of curvature of the eleventh surface and the twelfth surface are ∞; a distance on the optical axis between the eleventh surface and the tenth surface is 4.4 mm with a tolerance of 5%.

12. The near-infrared laser focusing lens according to claim 11, wherein a ratio of refractive index to Abbe number of the sixth lens is 1.5/64, the tolerance is 5%.

13. The near-infrared laser focusing lens according to claim 11, wherein a center thickness of the sixth lens is 1 mm, the tolerance is 5%.

14. A laser printing device, comprising a fiber laser, a printing drum, and a focusing lens configured to focus a laser emitted from the fiber laser on the printing drum, wherein the focusing lens is the near-infrared laser focusing lens according to claim 1.

15. The laser printing device according to claim 14, wherein the fiber laser has an output end connected to a plurality of densely arranged fibers, which are configured to transfer the laser to the near-infrared laser focusing lens.

16. The near-infrared laser focusing lens according to claim 1, wherein the third lens contacts the fourth lens, and the fourth lens contacts the second lens.

* * * * *